United States Patent
Stiesdal

(10) Patent No.: US 8,220,212 B2
(45) Date of Patent: Jul. 17, 2012

(54) CONCRETE TOWER

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/953,567

(22) Filed: Nov. 24, 2010

(65) Prior Publication Data

US 2011/0126481 A1    Jun. 2, 2011

(30) Foreign Application Priority Data

Dec. 1, 2009    (EP) .................................... 09014913

(51) Int. Cl.
*E04C 5/08* (2006.01)

(52) U.S. Cl. ..................... 52/223.5; 52/649.2; 52/223.13

(58) Field of Classification Search ................. 52/223.3, 52/223.1, 223.4, 223.5, 223.13, 649.2, FOR. 104
See application file for complete search history.

(56) References Cited

U.S. PATENT DOCUMENTS

| | | | | |
|---|---|---|---|---|
| 4,317,317 A | * | 3/1982 | Kilts et al. | 52/223.3 |
| 4,909,661 A | * | 3/1990 | Ivey | 404/6 |
| 6,790,544 B2 | * | 9/2004 | Schmitz | 428/703 |
| 7,448,170 B2 | * | 11/2008 | Skendži et al. | 52/90.1 |
| 7,591,893 B2 | * | 9/2009 | Amathieu et al. | 106/724 |
| 7,739,843 B2 | * | 6/2010 | Cortina-Cordero | 52/223.5 |
| 7,752,825 B2 | * | 7/2010 | Wobben | 52/848 |
| 2003/0000165 A1 | | 1/2003 | Tadros et al. | |
| 2005/0144866 A1 | * | 7/2005 | Chappell et al. | 52/294 |
| 2006/0248848 A1 | * | 11/2006 | Chappell et al. | 52/741.1 |
| 2006/0254168 A1 | * | 11/2006 | Wobben | 52/318 |
| 2011/0138707 A1 | * | 6/2011 | Bagepalli | 52/173.1 |

FOREIGN PATENT DOCUMENTS

| | | | |
|---|---|---|---|
| GB | 2237302 A | * | 5/1991 |
| WO | WO 9008635 A1 | | 8/1990 |
| WO | WO 2009056898 A1 | | 5/2009 |

* cited by examiner

*Primary Examiner* — Brian Glessner
*Assistant Examiner* — Brent W Herring

(57) ABSTRACT

A concrete tower is provided. The concrete tower may be a concrete tower for a wind turbine. The compressive strength of the concrete is changed in dependency of the height of the tower. The concrete tower includes a number of tendons that are arranged to pre-stress the concrete tower. Each tendon is anchored with the concrete tower at a first end of the tendon and at a second end of the tendon.

7 Claims, 2 Drawing Sheets

CONCRETE TOWER

CROSS REFERENCE TO RELATED APPLICATIONS

This application claims priority of European Patent Office application No. 09014913.9 EP filed Dec. 1, 2009, which is incorporated by reference herein in its entirety.

FIELD OF INVENTION

The invention relates to a concrete tower, especially to a concrete tower for a wind turbine.

BACKGROUND OF INVENTION

A tower for a wind turbine contains typically two elements. The first tower element is the foundation, while the second tower element is the tower itself.

There are numerous ways to design the foundation. Typically the foundation is built up by help of reinforced concrete. The foundation is subdivided, thus it covers a spread foundation-area. This type of foundation is very suitable for sites with a bearing soil.

The tower is exposed to dynamic loads and to static loads. The dynamic loads are caused by the wind and are caused by the supported wind turbine, which is mounted on top of the tower.

Wind turbine towers are made of concrete. Especially for offshore sites the towers are constructed in a way that a long life time of 20 years or more is ensured.

The concrete of an offshore-tower has a dampening property, which is higher than the damping property of other materials.

Preferably pre-stressed concrete is used for towers, thus a high fatigue resistance is achieved. Thus the risk of dynamic failure is avoided.

Pre-stressed concrete towers show good fatigue properties in comparison with steel. Additionally the pre-stressed concrete tower is cheaper than others due to the lower material costs.

A typical concrete tower is known from the document WO 2009 056 898 A1 for example.

A preferred wind turbine tower is conical. The tower contains a number of segments, which are pre-stressed or which are post-tensioned.

Preferably each tower-segment contains a number of tendons, which are used to ensure and to connect it with other segments. Thus the tendons are secured at various heights of the resulting tower. They are anchored at or near the foundation of the tower.

FIG. 3 shows a well known structure of a concrete tower T. The tower contains three segments SEG1, SEG2 and SEG3.

The top segment SEG3 is secured by 24 tendons TD for example. The 24 tendons TD are connected with the resulting tower T near the top of the tower T. They are also connected with the resulting tower T in the area, where segment SEG2 and segment SEG1 are joined together. Last they are connected with the resulting tower T near or at the foundation of the tower T.

The segment SEG2 is secured by 6 additional tendons TD for example. The 6 additional tendons TD are connected with the resulting tower T near the area, where segment SEG2 and segment SEG1 are joined together. They are connected with the resulting tower T near or at the foundation of the tower T.

Thus the top view of the tower T shows channels for 24 tendons TD within the cross section of SEG3, while the top view of the tower T shows channels for 30 tendons TD within the cross section of SEG1.

To secure and to anchor all the tendons in the different cross sections is complex and time-consuming. Thus this work is a serious point within the calculation of the tower.

The most tension forces acts on the lower segments as the tendons are anchored at various heights.

Thus the lower segments have a larger cross sectional area of concrete than the upper segments.

The top segment shows a smallest cross sectional area of concrete, thus the smallest tension is applied there.

SUMMARY OF INVENTION

It is the object of the invention to provide an improved tower, especially for a wind turbine, which allows to reduce the complexity of the tower-assembly and to reduce the needed costs, too.

This object is achieved by the features of the claims. Preferred configurations are object of the dependant claims.

The invention relates tot a concrete tower for a wind turbine. According to the invention the compressive strength of the concrete is changed in dependency of the height of the tower.

Preferably the tower contains a number of tendons. The tendons are arranged in a way that the concrete tower is pre-stressed.

Preferably each tendon is anchored with the concrete tower only at a first end of the tendon and at a second end of the tendon.

Preferably the second end of each tendon is anchored near the top of the tower, while the first end of each tendon is anchored near the foundation of the tower.

Preferably the compressive strength (fundamental strength) of the concrete is increased in a proportional manner in dependency of the height of the tower. Thus a decrease in the cross section of the concrete in a certain height of the tower is achieved. This decrease is compensated with an increase of the compressive strength of the concrete.

According to the invention the construction of the concrete tower withstands an increase in the "tension force" per "cross sectional area of the concrete", if tendons are used as described above in the preferred configurations.

Concrete is made by a mixture of cement and water. Thus the concrete covers a range between a very coarse concrete up to a very fine concrete. If required specific admixtures are added to the concrete. The characteristic of the concrete, like the compressive strength, is determined by the amount and the size of each introduced material.

Cement powder forms a paste when mixed with water. The paste acts like a glue that holds or bonds the aggregates together.

Cement is made in a range with different properties, like:
cement for general purposes,
low heat cement,
shrinkage limited cement, etc.

Cement used for concrete can be a mixture of basic cements with different properties and characteristics.

Aggregates are basically of two types i.e. fine (fine and coarse sands and rusher fines) and coarse (crushed rock, gravel or screenings). In general the aggregates should be strong, hard and durable.

The compressive strength (cube strength, fundamental strength) of the concrete is influenced by numerous factors, like:
compaction (i.e. the content of air in the concrete),
curing (keeping the concrete damp),
weather (during the curing),
type of cement or cement mixture, and
water to cement ratio (the lower the ratio the stronger the concrete).

According to the present invention the compressive strength of the concrete is increased, if the height of the tower is increased.

Preferably the density of the concrete is increased in accordance to the increasing tower height. This may be assured by the use of mechanical vibrator-machines, used to increase the density of the concrete.

Preferably the varying concrete strength is obtained by a gradually change of the mixture of the cement types.

For example it starts with a mixture, which has a relatively low concrete strength (being used for the lower part of the tower). It ends with a mixture, which ahs a relative high concrete strength (being used for the upper part of the tower).

According to the invention the concrete strength of the concrete is varied or increased proportional to the increase of the tower-height. Thus a simple tower construction with fewer tendons and without "mid-way" anchoring of tendons is achieved.

Due to the varying strength of the concrete the stability and the general advantages for pre-stressed concrete towers (good fatigue properties compared to steel and low material costs etc.) are ensured.

Another advantage is that fewer tendons are needed and therefore the construction of the tower is simple. Thus costs are reduced.

Each tower-section or used tower-segment has different and individual concrete strengths. The tower-section with the highest strength is the section with the smallest diameter, while the section with the smallest strength is the section with the largest diameter.

It has to be noted that the varying of the concrete strength in relation to the tower height may follow various linear or non-linear characteristic-lines.

The characteristic lines may be optimized to the site of the planned tower, to the environment conditions there, etc.

Due to the invention it is ensured that the "tension force" per "concrete cross sectional area unit" is substantially equal over the entire height of the tower.

BRIEF DESCRIPTION OF THE DRAWINGS

The invention is described in more detail by the next figures. The figures are only an example and do not limit the scope of the invention.

DETAILED DESCRIPTION OF INVENTION

Figure 1:
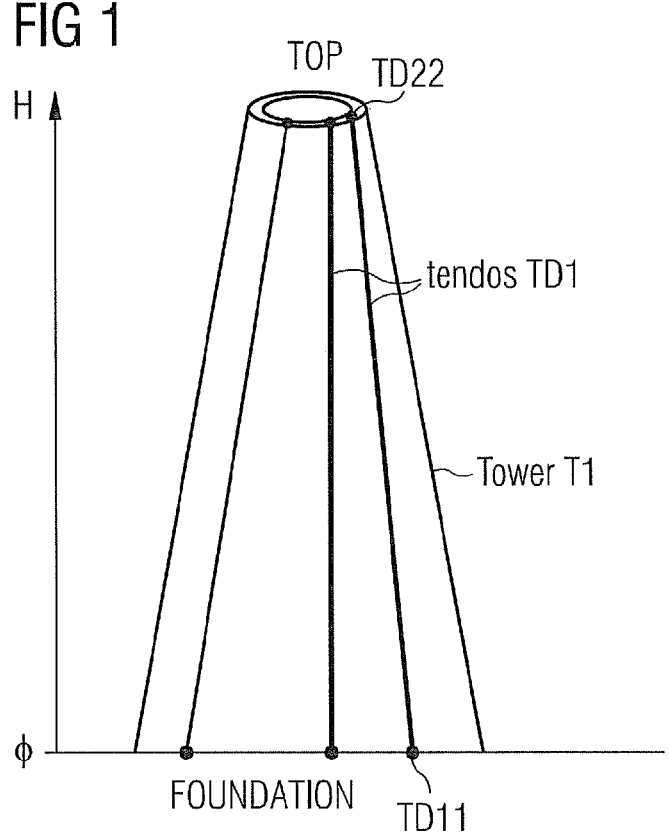
FIG. 1 shows a concrete tower according to the invention.

FIG. 1 shows a concrete tower T1 according to the invention.

The concrete tower T1 contains a number of tendons TD1.

The tendons TD1 are arranged in a way that the concrete tower T1 is pre-stressed. Each tendon TD1 is anchored with the concrete tower T1 only at a first end TD11 of the tendon TD1 and at a second end TD22 of the tendon TD1.

The second end TD22 of each tendon TD1 is anchored near the top of the tower, while the first end TD11 of each tendon TD1 is anchored near the foundation of the tower.

The compressive strength of the concrete is changed in dependency of the height H of the tower T1.

Preferably the compressive strength (fundamental strength) of the concrete is increased in a proportional manner in dependency of the height H of the tower T1.

Figure 2:
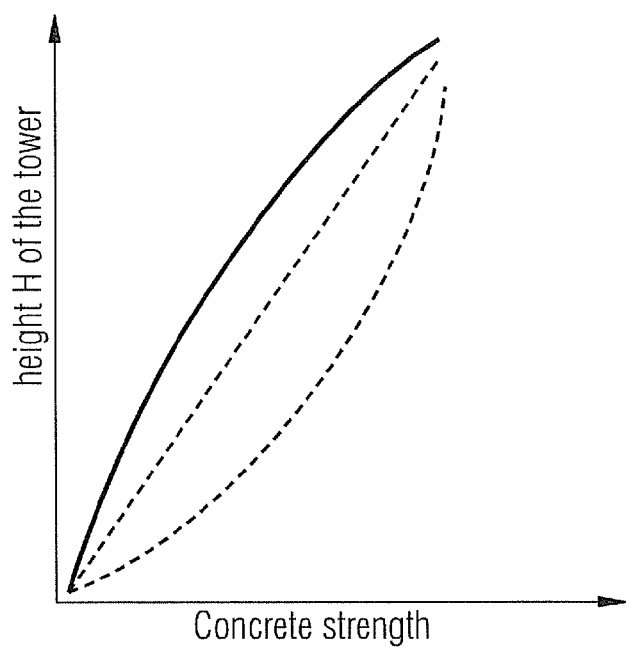
FIG. 2 shows different characteristic-lines to be used according to the invention.
Figure 3:
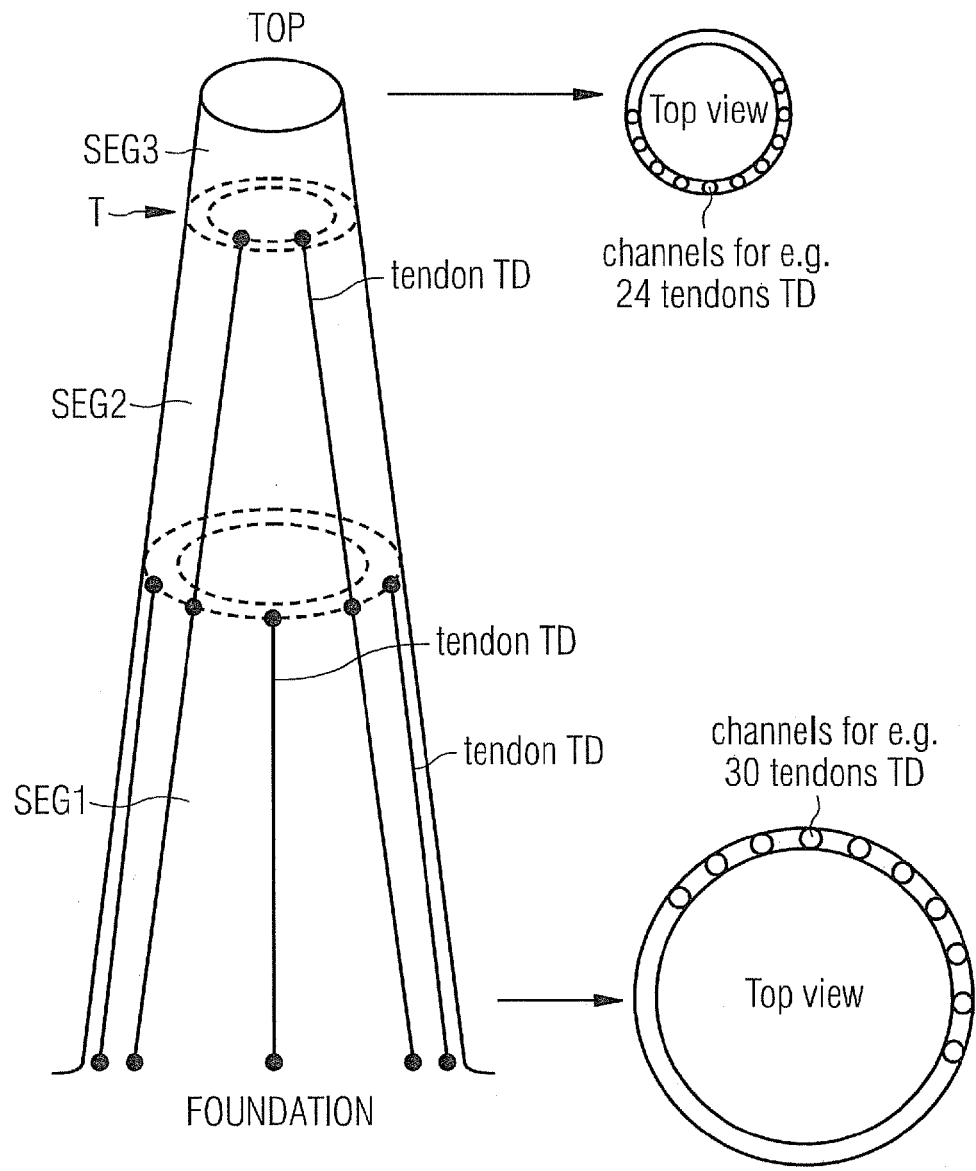
FIG. 3 shows a well known concrete tower as described in the introduction of this application.

FIG. 2 shows different characteristic-lines to be used according to the invention.

The invention claimed is:

1. A concrete tower for a wind turbine, comprising:
a plurality of tendons,
wherein the plurality of tendons are arranged to pre-stress the concrete tower, and wherein the compressive strength of the concrete is changed in dependency of a height of the concrete tower, and
wherein a density of the concrete increases proportionally to an increase of the height of the tower.

2. The concrete tower according to claim 1, wherein each tendon is anchored with the concrete tower only at a first end of the tendon and at a second end of the tendon.

3. The concrete tower according to claim 2,
wherein the second end of each tendon is anchored near a top of the tower, and/or
wherein the first end of each tendon is anchored near a foundation of the tower.

4. The concrete tower according to claim 1,
wherein the concrete includes a first compressive strength at the foundation of the tower,
wherein the concrete includes a second compressive strength at the top of the tower, and
wherein the second compressive strength is greater than the first compressive strength.

5. The concrete tower according to claim 1,
wherein at least two segments are arranged to construct the concrete tower,
wherein the at least two segments are pre-stressed by the plurality of tendons,
wherein each tendon is anchored with the resulting tower only at a first end of the tendon and at a second end of the tendon,
wherein the first end of each tendon is anchored with a first segment, which is arranged near or at the foundation, and
wherein the second end of each tendon is anchored with a second segment, which is arranged near or at the top of the tower.

6. The concrete tower according to claim 1, wherein the compressive strength of the concrete increases proportionally to an increase in the height of the concrete tower.

7. The concrete tower according to claim 1, wherein a cross sectional area of the concrete decreases when the height of the concrete tower increases.

* * * * *